(12) United States Patent
Seo et al.

(10) Patent No.: US 12,537,358 B2
(45) Date of Patent: Jan. 27, 2026

(54) LASER RADAR DEVICE PERFORMING MULTI-STAGE AMPLIFICATION

(71) Applicant: ELECTRONICS AND TELECOMMUNICATIONS RESEARCH INSTITUTE, Daejeon (KR)

(72) Inventors: Hong-Seok Seo, Daejeon (KR); Bongki Mheen, Daejeon (KR); Munhyun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1127 days.

(21) Appl. No.: 17/513,586

(22) Filed: Oct. 28, 2021

(65) Prior Publication Data

US 2022/0231475 A1 Jul. 21, 2022

(30) Foreign Application Priority Data

Jan. 20, 2021 (KR) ........................ 10-2021-0008217

(51) Int. Cl.
*H01S 3/094* (2006.01)
*G01S 7/481* (2006.01)
(Continued)

(52) U.S. Cl.
CPC ...... *H01S 3/094053* (2013.01); *G01S 7/4814* (2013.01); *G02B 6/036* (2013.01);
(Continued)

(58) Field of Classification Search
CPC ........ G02B 6/0006; G02B 2006/12147; H01S 3/094061; H01S 3/094053; H01S 3/2316; H01S 3/06758
See application file for complete search history.

(56) References Cited

U.S. PATENT DOCUMENTS 5,268,979 A * 12/1993 Weidman ............. G02B 6/2835
385/127
6,011,644 A * 1/2000 Button ................ H01S 3/06758
359/337.4
(Continued)

FOREIGN PATENT DOCUMENTS

EP 1111741 A2 6/2001
JP H11136193 A 5/1999
(Continued)

*Primary Examiner* — Eric L Bolda
(74) *Attorney, Agent, or Firm* — LRK PATENT LAW FIRM

(57) ABSTRACT

Disclosed is a laser radar device, which includes a signal light source that outputs a first signal light, a pump light source that outputs a pump light, a pump optical fiber that transfers the pump light, a first signal optical fiber that transfers the first signal light, a first amplifier that receives and amplifies the first signal light from the first signal optical fiber, a second signal optical fiber that receives and transfers a second signal light from the first amplifier, the second signal light being obtained by amplifying the first signal light, a second amplifier that receives and amplifies the second signal light from the second signal optical fiber, and an optical coupler connected to the first signal optical fiber, the second signal optical fiber, and the pump optical fiber, and that distributes the pump light to the first signal optical fiber and the second signal optical fiber.

17 Claims, 12 Drawing Sheets

(51) Int. Cl.
    *G02B 6/036*    (2006.01)
    *H01S 3/067*    (2006.01)
    *H01S 3/23*     (2006.01)

(52) U.S. Cl.
    CPC .... *H01S 3/06758* (2013.01); *H01S 3/094061* (2013.01); *H01S 3/2316* (2013.01); *G01S 7/4818* (2013.01)

(56) References Cited

U.S. PATENT DOCUMENTS

| | | | |
|---|---|---|---|
| 6,295,161 | B1 | 9/2001 | Bazzocchi |
| 6,434,295 | B1 * | 8/2002 | MacCormack ......... H01S 3/067 385/27 |
| 6,434,302 | B1 | 8/2002 | Fidric et al. |
| 8,290,003 | B2 | 10/2012 | Kakui |
| 8,611,003 | B2 | 12/2013 | Ahn |
| 10,441,176 | B2 | 10/2019 | Islam |
| 10,666,011 | B2 | 5/2020 | Wang et al. |
| 2002/0008901 | A1 * | 1/2002 | Kinoshita ............... H01S 3/302 359/341.1 |
| 2009/0296745 | A1 | 12/2009 | Morse et al. |
| 2015/0340832 | A1 * | 11/2015 | Meli .................. H01S 3/06758 398/49 |
| 2019/0181605 | A1 | 6/2019 | Seo et al. |

FOREIGN PATENT DOCUMENTS

| | | | |
|---|---|---|---|
| JP | 3936533 | B2 | 6/2007 |
| JP | 2015128157 | A | 7/2015 |

\* cited by examiner

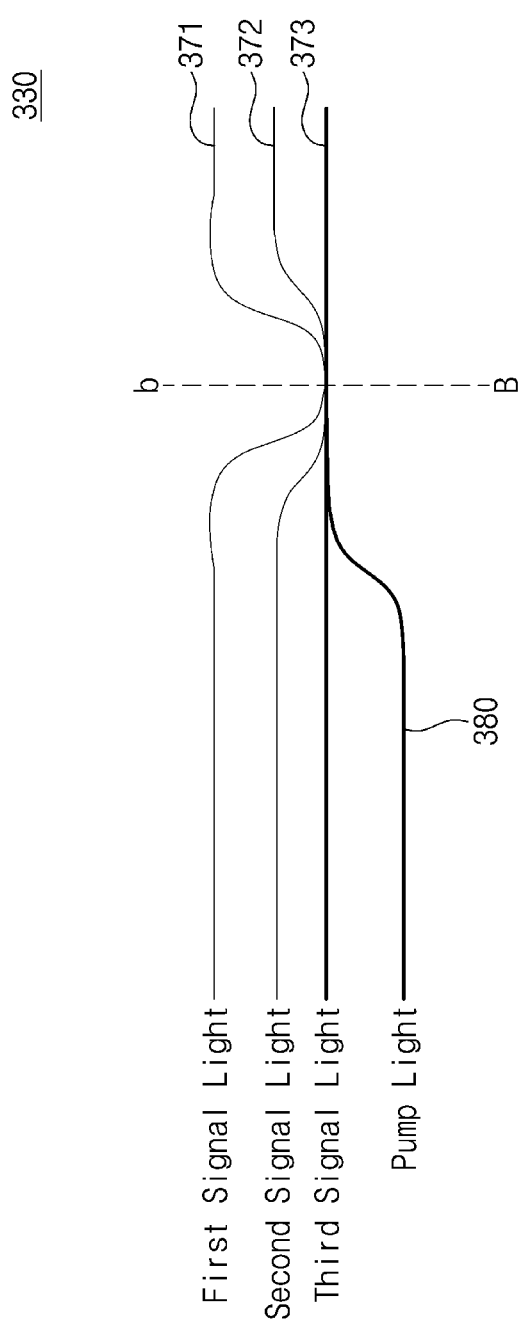

LASER RADAR DEVICE PERFORMING MULTI-STAGE AMPLIFICATION

CROSS-REFERENCE TO RELATED APPLICATION

This application claims priority under 35 U.S.C. § 119 to Korean Patent Application No. 10-2021-0008217, filed on Jan. 20, 2021, in the Korean Intellectual Property Office, the disclosure of which is incorporated by reference herein in its entirety.

BACKGROUND

1. Field of the Invention

Embodiments of the present disclosure described herein relate to a laser radar device for acquiring three-dimensional images and video, and more particularly, relate to a laser radar device for performing multi-stage amplification by using a single optical coupler.

2. Description of Related Art

A laser radar device is an image sensor device that secures three-dimensional images, and is used in many fields such as unmanned autonomous robots and automobiles, structural change status check, landslide check, and military robots.

The laser radar device is not a method of constructing an image from external light, but a method of measuring the received light by shooting a light source, and may be used regardless of a surrounding environment. The laser radar device may acquire distance information to an object by shooting a laser light source to an object and measuring the returned light source. A pulse light source and a continuous wave (CW) light source may be used as the light source. The pulse light source is more widely used than the CW light source because it is relatively advantageous in far-field measurement and a resolution is improved to cm-level with the development of technology.

To increase an output of the laser radar device using the pulse light source, the number of amplification stages for amplifying a seed light source (laser) may be increased. In this case, when the number of pump light sources (lasers) increases as much as the number of amplification stages, a price of the laser radar device increases, and the number of pump-signal optical couplers to be used together increases. In addition, an area of a driving board of the pump light source should be increased for independent control, and an amount of input current is also increased.

SUMMARY

Embodiments of the present disclosure provide a laser radar device that efficiently performs multi-stage amplification using a single signal light source (seed light source) and a single pump light source.

According to an embodiment of the present disclosure, a laser radar device includes a signal light source that outputs a first signal light, a pump light source that outputs a pump light, a pump optical fiber that transfers the pump light, a first signal optical fiber that transfers the first signal light, a first amplifier that receives and amplifies the first signal light from the first signal optical fiber, a second signal optical fiber that receives and transfers a second signal light from the first amplifier, the second signal light being obtained by amplifying the first signal light, a second amplifier that receives and amplifies the second signal light from the second signal optical fiber, and an optical coupler connected to the first signal optical fiber, the second signal optical fiber, and the pump optical fiber, and that distributes the pump light to the first signal optical fiber and the second signal optical fiber.

According to an embodiment, the optical coupler may be configured such that the first signal optical fiber and the second signal optical fiber are tapered and fused in parallel to each other, and the optical coupler may be configured such that the pump optical fiber is tapered and fused in parallel to the second signal optical fiber and the pump optical fiber is spaced apart from the first signal optical fiber.

According to an embodiment, the pump optical fiber may be heated and elongated in a direction parallel to the second signal optical fiber and may be tapered and fused to the second signal optical fiber. The first signal optical fiber may include a first core and a first clad, the second signal optical fiber may include a second core and a second clad, the second core may receive the second signal light from the first amplifier, and the second clad may receive the pump light from the pump optical fiber in the optical coupler.

According to an embodiment, the first core may receive the first signal light from the signal light source, and the first clad may receive a first portion of the pump light from the second clad in the optical coupler.

According to an embodiment, the first amplifier may include a first gain medium that absorbs a first portion of the pump light and amplifies the first signal light.

According to an embodiment, the second amplifier may include a second gain medium that absorbs a second portion of the pump light and amplifies the second signal light.

According to an embodiment, a power of the second portion may be greater than a power of the first portion.

According to an embodiment, the first amplifier may further include an optical isolator that enters the second signal light in a traveling direction, and a filter that removes noise of the second signal light.

According to an embodiment, the first signal optical fiber and the second signal optical fiber may include a double clad optical fiber.

According to an embodiment of the present disclosure, a laser radar device includes a signal light source that outputs a first signal light, a pump light source that outputs a pump light, a pump optical fiber that transfers the pump light, a first signal optical fiber that transfers the first signal light, a first amplifier that receives and amplifies the first signal light from the first signal optical fiber, a second signal optical fiber that receives and transfers a second signal light from the first amplifier, the second signal light being obtained by amplifying the first signal light, a second amplifier that receives and amplifies the second signal light from the second signal optical fiber, a third signal optical fiber that receives and transfers a third signal light from the second amplifier, the third signal light being obtained by amplifying the second signal light, a third amplifier that receives and amplifies the third signal light from the third signal optical fiber, and an optical coupler connected to the first signal optical fiber, the second signal optical fiber, the third signal optical fiber, and the pump optical fiber, and that distributes the pump light to the first signal optical fiber, the second signal optical fiber, and the third signal optical fiber.

According to an embodiment, the optical coupler may be configured such that the first signal optical fiber, the second signal optical fiber, and the third signal optical fiber are tapered and fused in parallel to one another, and the optical coupler may be configured such that the pump optical fiber is fused in parallel to the third signal optical fiber and the pump optical fiber is spaced apart from the first signal optical fiber and the second signal optical fiber.

According to an embodiment, the pump light may be transferred from the pump optical fiber to the third signal optical fiber through the optical coupler.

According to an embodiment, a first portion of the pump light may be transferred from the third signal optical fiber to the first signal optical fiber through the optical coupler, and a second portion of the pump light may be transferred from the third signal optical fiber to the second signal optical fiber through the optical coupler.

According to an embodiment, the first amplifier may include a first gain medium that absorbs the first portion of the pump light and amplifies the first signal light, and the second signal light amplified by the first gain medium may be input to the second signal optical fiber.

According to an embodiment, the second amplifier may include a second gain medium that absorbs the second portion of the pump light and amplifies the second signal light, and the third signal light amplified by the second gain medium may be input to the third signal optical fiber.

According to an embodiment, the third amplifier may include a third gain medium that absorbs a third portion of the pump light and amplifies the second signal light, and a signal light amplified by the third gain medium may be output to an end cap.

According to an embodiment, an output of the third portion may be greater than a sum of an output of the first portion and an output of the second portion.

According to an embodiment of the present disclosure, a pump-to-signal optical coupler includes a first signal optical fiber that receives a first signal light from a signal light source, a pump optical fiber that receives a pump light from a pump light source, and a second signal optical fiber that receives the pump light from the pump optical fiber and to transfer an second signal light. The first signal optical fiber includes a first core through which the first signal light is transferred and a first clad surrounding the first core, the second signal optical fiber includes a second core through which the second signal light is transferred and a second clad surrounding the second core, the pump optical fiber is fused to the second clad in parallel to transfer the pump light to the second clad, and the second clad is in contact with the first clad in parallel to couple a first portion of the pump light to the first clad.

According to an embodiment, the first clad may transfer the first portion of the pump light to the first core through a first gain medium, and the first core may amplify the first signal light based on the first portion to generate the second signal light, and may transfer the second signal light which is obtained by amplifying the first signal light to the second core.

According to an embodiment, the second clad may transfer a second portion of the pump light to the second core through a second gain medium, the second core may amplify and output the second signal light based on the second portion, and a power of the second portion may be greater than a power of the first portion.

BRIEF DESCRIPTION OF THE DRAWINGS

The above and other objects and features of the present disclosure will become apparent by describing in detail embodiments thereof with reference to the accompanying drawings.

FIGS. 7A to 7C are diagrams illustrating an optical coupler of FIG. 6.

DETAILED DESCRIPTION

Hereinafter, embodiments of the present disclosure will be described clearly and in detail such that those skilled in the art may easily carry out the present disclosure.

Figure 1:
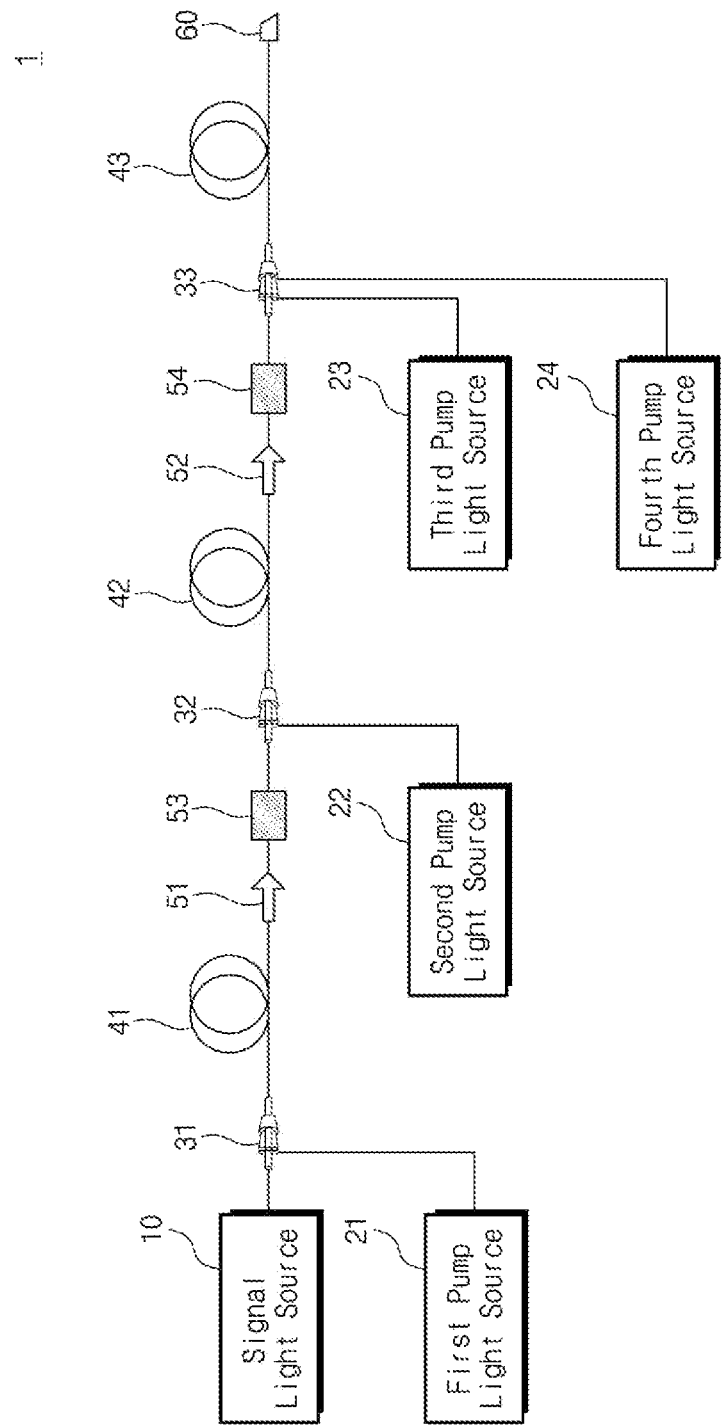
FIG. 1 is a block diagram describing a laser radar device that performs multi-stage amplification through a plurality of pump light sources.

FIG. 1 is a block diagram describing a typical laser radar device that performs multi-stage amplification through a plurality of pump light sources. Referring to FIG. 1, a laser radar device 1 may include a signal light source 10, a plurality of pump light sources 21, 22, 23, and 24, a plurality of optical couplers 31, 32, and 33, and a plurality of gain media 41, 42, and 43, a plurality of optical isolators 51 and 52, a plurality of filters 53 and 54, and an end cap 60.

The signal light source 10 may output a first signal light to a core of an optical fiber. The first pump light source 21 may output a first pump light to a clad of the optical fiber through the first optical coupler 31. The first gain medium 41 may transfer the first pump light to the first signal light to amplify the first signal light and output a second signal light. The first optical isolator 51 may transfer the second signal light without loss in a traveling direction and may remove noise or reflected signals incident in the opposite direction to the traveling direction. The first filter 53 may remove noise generated after amplification and may transfer a clean second signal light to the second optical coupler 32.

The second pump light source 22 may output the second pump light to the clad of the optical fiber through the second optical coupler 32. The second gain medium 42 may transfer the second pump light to the second signal light to amplify the second signal light and output a third signal light. Since the second optical isolator 52 and the second filter 54 are similar to the first optical isolator 51 and the first filter 53, additional description thereof will be omitted to avoid redundancy.

The third pump light source 23 and the fourth pump light source 24 may output the third pump light and the fourth pump light to the clad of the optical fiber through the third optical coupler 33. The third gain medium 43 may transfer the third pump light and the fourth pump light to the third signal light to amplify the third signal light and output a fourth signal light. The end cap 60 may output the fourth signal light to an external target of the laser radar device 1.

As described above, the laser radar device 1 may constitute a three-stage amplification stages. A first-stage amplification stage may include the first pump light source 21, the first optical coupler 31, the first gain medium 41, the first optical isolator 51, and the first filter 53. A second-stage amplification stage may include the second pump light source 22, the second optical coupler 32, the second gain medium 42, the second optical isolator 52, and the second filter 54. A third-stage amplification stage may include the third pump light source 23, the fourth pump light source 24, the third optical coupler 33, and the third gain medium 43.

In detail, to configure the three-stage amplification stages, each amplification stage may receive the pump light from one or more pump light sources. However, this type of multi-stage amplification stage configuration has several problems.

First, the pump light source may output the pump light only when a driving current is equal to or greater than a threshold current, and thus separate driving power is required. Therefore, as the number of pump light sources increases or a pump light source having a high output is used, the driving power for generating the threshold current may be great. Next, the minimum power of the plurality of pump light sources 21, 22, 23, and 24 is commercialized and manufactured based on 10 W. However, the power required to configure the first and second amplification stages may be less than 5 W even when the first and second amplification stages are combined. That is, for the configuration of the first amplification stage and the second amplification stage, it is inefficient because a pump light source of 10 W should be individually connected. Finally, as the multi-stage amplification stage as illustrated in FIG. 1 is composed of the plurality of pump light sources 21, 22, 23, and 24 and the plurality of optical elements 31, 32, 33, 51, 52, 53, and 54, the design is complex. Since the driving board also needs to independently control the plurality of pump light sources 21, 22, 23, and 24, an area of the driving board may be increased.

The present disclosure proposes a laser radar device capable of performing multi-stage amplification using a single signal light source and a single pump light source to reduce the size, cost, and power of the laser radar device.

Figure 2:
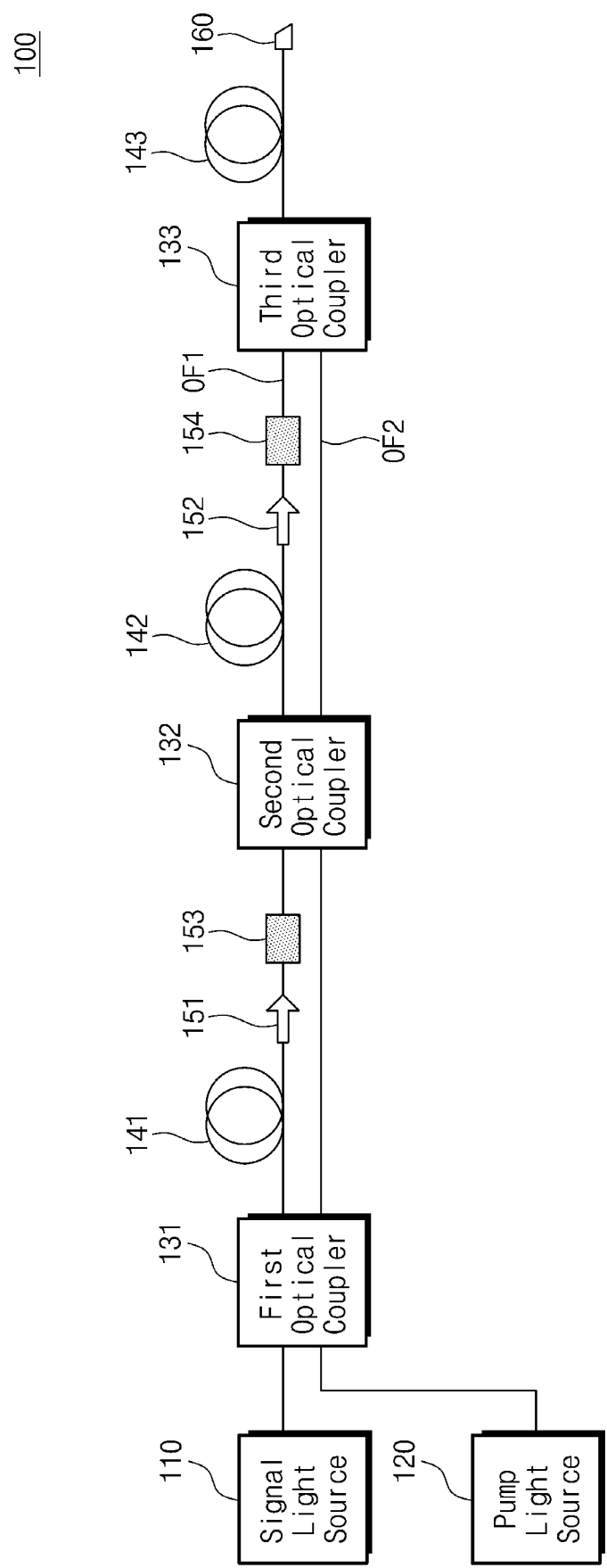
FIG. 2 is a block diagram of a laser radar device according to an embodiment of the present disclosure.

FIG. 2 is a block diagram of a laser radar device according to an embodiment of the present disclosure. Referring to FIG. 2, a laser radar device 100 may include a single signal light source 110, a single pump light source 120, first to third optical couplers 131, 132, and 133, and first to third gain media 141, 142, and 143, first and second optical isolators 151 and 152, first and second filters 153 and 154, and an end cap 160.

Since the signal light source 110, the first to third gain media 141, 142, and 143, the first and second optical isolators 151 and 152, the first and second filters 153 and 154, and the end cap 160 of FIG. 2 are similar to the signal light source 10, the first to third gain media 41, 42, and 43, and the first and second optical isolators 51 and 52, the first and second filters 53 and 54, and the end cap 60 of FIG. 1, and thus additional description thereof will be omitted to avoid redundancy.

A first optical fiber OF1 is an optical fiber through which the signal light travels, and it means an optical fiber connected from the signal light source 110 to the end cap 160, and a second optical fiber OF2 is an optical fiber through which the pump light travels and may be an optical fiber connected from the pump light source 120 to the third optical coupler 133.

The signal light source 110 may output the first signal light to a core of the first optical fiber OF1. Although not illustrated, the first optical fiber OF1 may be a double clad fiber including a first core, a first clad surrounding an outer circumferential surface of the first core, and a second clad surrounding an outer circumferential surface of the first clad.

The pump light source 120 may output the pump light to a core of the second optical fiber OF2. The second optical fiber OF2 may be a multi-mode fiber including a second core of a multi-mode. The second core may be made of the same material as the first clad of the first optical fiber OF1. According to an embodiment, the second optical fiber OF2 may include a third clad surrounding an outer circumferential surface of the second core. Alternatively, the second optical fiber OF2 may include a silica optical fiber without a core cladding structure.

The first optical coupler 131 may couple a portion of the pump light to the first clad of the first optical fiber OF1. A portion of the pump light may be transferred from the second optical fiber OF2 to the first optical fiber OF1 through the first optical coupler 131. In detail, the portion of the pump light may be transferred from the core of the second optical fiber OF2 to the first clad of the first optical fiber OF1.

For example, when the output of the pump light is 27 W, 1 W, which is the portion of the pump light, may be coupled to the first signal light through the first optical coupler 131. The output of the remaining 26 W may remain in the second optical fiber OF2. To this end, the first optical coupler 131 may be manufactured by twisting the second optical fiber OF2 to the first optical fiber OF1 and stretching the second optical fiber OF2 with a micro-torch. In this case, the tensile distance may be adjusted while measuring a coupling degree of the pump light.

The first gain medium 141 may include an active material that absorbs the pump light coupled from the first optical coupler 131 and occurs an amplified spontaneous emission (ASE). The active material may contain rare earth elements. The rare earth element may absorb the pump light supplied through the second optical fiber OF2 and may emit laser light of a single wavelength while electrons excited to a metastable state are stabilized. The rare earth element may include at least one of erbium (Er), ytterbium (Yb), and thulium (Tm).

The first signal light is amplified into a second signal light while passing through the first gain medium 141, and the second signal light may transferred to the second optical coupler 132 through the first optical isolator 151 and the first filter 153.

The second optical coupler 132 may couple another portion of the pump light to the first optical fiber OF1. The another portion of the pump light may be a portion of the pump light remaining in the second optical fiber OF2 while passing through the first optical coupler 131. Another portion of the pump light may be transferred from the second optical fiber OF2 to the first optical fiber OF1 through the second optical coupler 132.

For example, when the pump light of 26 W remains in the second optical fiber OF2 after passing through the first optical coupler 131, 2 W, which is another portion of the pump light, may be used for amplification of the second signal light through the second optical coupler 132. The output of the remaining 24 W may remain in the second optical fiber OF2. To this end, the second optical coupler 132 may be manufactured similarly to the manufacturing method of the first optical coupler 131.

A tensile distance of the second optical coupler 132 may be longer than a tensile distance of the first optical coupler 131. When two optical fibers are stretched by heating, a cross-sectional area of the two optical fibers becomes thinner. In this case, the distance from the tapering start point to the end point may be referred to as a tensile distance. In other words, the two optical fibers are stretched and tapered by heating, and the tensile distance may be a distance from a starting point of tapering to an ending point. As the tensile distance increases, the two optical fibers may be located closer together, and a degree of coupling may be increased. For example, to couple a pump light output of 1 W in the first optical coupler 131 and a pump light output of 2 W in the second optical coupler 132, the tensile distance of the second optical coupler 132 may be manufactured to be greater than the tensile distance of the first optical coupler 131.

Since the second gain medium 142 is similar to the first gain medium 141, additional description thereof will be omitted to avoid redundancy. The second signal light is amplified into a third signal light while passing through the second gain medium 142, and the third signal light may be transferred to the third optical coupler 133 through the second optical isolator 152 and the second filter 154.

The third optical coupler 133 may couple the remaining portion of the pump light to the first optical fiber OF1. The remaining portion of the pump light may be the pump light remaining in the second optical fiber OF2 while passing through the second optical coupler 132. The remaining portion of the pump light may be transferred from the second optical fiber OF2 to the first optical fiber OF1 through the third optical coupler 133.

For example, when the pump light of 24 W remains in the second optical fiber OF2 after passing through the second optical coupler 132, the remaining 24 W of the pump light may be used for amplification of the third signal light through the third optical coupler 133. To this end, the third optical coupler may be manufactured by tensioning the second optical fiber OF2 with a micro-torch and bonding (fusing) the second optical fiber OF2 in parallel to the first optical fiber OF1. In this case, the second optical fiber OF2 may be stretched until the cross-sectional area becomes less than or equal to a reference value.

Since the third gain medium 143 is similar to the first gain medium 141, additional description thereof will be omitted. The third signal light may be amplified while passing through the third gain medium 143 and may be transferred to the outside through the end cap 160.

As described above, the laser radar device 100 of FIG. 2 may perform three-stage amplification using the single pump light source 120. Although the multi-stage amplification is illustrated as three-stage amplification in FIG. 2, the number of amplification stages is not limited thereto. Accordingly, the laser radar device 100 may reduce the number of pump light sources for multi-stage amplification, thereby reducing the threshold current for driving the pump light source and increasing the efficiency of the driving board. However, the number of optical elements is still many. Hereinafter, a structure of a laser radar device capable of reducing the number of optical elements will be described.

Figure 3:
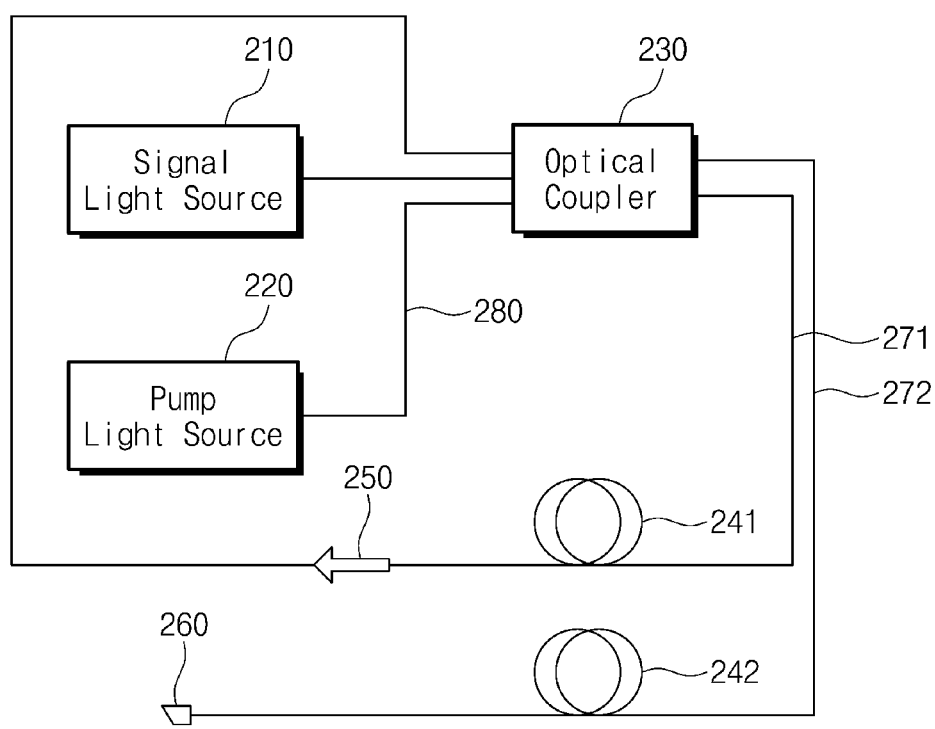
FIG. 3 is a block diagram of a laser radar device according to an embodiment of the present disclosure.

FIG. 3 is a block diagram of a laser radar device according to an embodiment of the present disclosure. Referring to FIGS. 2 and 3, a laser radar device 200 may include a signal light source 210, a pump light source 220, an optical coupler 230, first and second gain media 241 and 242, an optical element 250, and an end cap 260. Since the signal light source 210, the pump light source 220, the first and second gain media 241 and 242, and the end cap 260 of FIG. 3 are similar to the signal light source 110, the pump light source 120, the first and second gain media 141 and 142, and the end cap 160, additional description thereof will be omitted.

Hereinafter, the first portion of the pump light may be a portion through which the pump light is transferred from the second signal optical fiber to the first signal optical fiber through the optical coupler 230, and the second portion of the pump light may be a portion through which the pump light is transferred from the pump optical fiber to the second signal optical fiber through the optical coupler 230. Most of the power of the pump light may be transferred to the second signal optical fiber through the second portion. The power of the pump light from the second signal optical fiber to the first signal optical fiber may be transferred back to the first portion.

The signal light source 210 may output the first signal light to a first signal optical fiber 271. The first signal light may be amplified by receiving the first portion of the pump light. The second signal light which is obtained by amplifying the first signal light may be transferred through a second signal optical fiber 272. The second signal light may receive the second portion of the pump light, and then may be amplified and output. The second portion of the pump light may be a portion of the pump light excluding the first portion of the pump light.

The pump light source 220 may output the pump light to a pump optical fiber 280. The pump optical fiber 280 may be coupled to the second signal optical fiber 272 in the optical coupler 230 to transfer the pump light to the second signal optical fiber 272. A first portion of the pump light introduced into the second signal optical fiber 272 may be transferred to the first signal optical fiber 271 to be used for amplification of the first signal light. A second portion of the pump light introduced into the second signal optical fiber 272 may remain in the second signal optical fiber 272 to be used for amplification of the second signal light.

The first signal optical fiber 271 and the second signal optical fiber 272 may include a double clad optical fiber, and the pump optical fiber 280 may include a multi-mode optical fiber.

In the optical coupler 230, the first signal optical fiber 271, the second signal optical fiber 272, and the pump optical fiber 280 may be coupled. For example, the first signal optical fiber 271 and the second signal optical fiber 272 may be bonded (tapered and fused) parallel to each other, and the pump optical fiber 280 may be bonded parallel to the second signal optical fiber 272. In this case, the pump optical fiber 280 may be disposed to be spaced apart from the first signal optical fiber 271.

The optical coupler 230 may distribute the pump light transferred from the pump optical fiber 280 to the first signal optical fiber 271 and the second signal optical fiber 272. The pump light may be introduced into the second signal optical fiber 272 from the pump optical fiber 280. In detail, the pump light may be coupled to the clad of the second signal optical fiber 272. To this end, the pump optical fiber 280 may be stretched by a micro-torch and bonded in parallel to the second signal optical fiber 272. In this case, the pump optical fiber 280 may be stretched until the cross-sectional area is equal to or less than a predetermined area.

The optical coupler 230 may distribute the first portion of the pump light introduced into the second signal optical fiber 272 to the first signal optical fiber 271. In detail, the first portion of the pump light may be coupled to the clad of the first signal optical fiber 271. To this end, the first signal optical fiber 271 and the second signal optical fiber 272 may be stretched by a micro-torch and bonded in parallel to each other. In this case, when the tensile distance is adjusted while measuring the coupling degree of the first signal optical fiber 271 and the second signal optical fiber 272, the optical coupler 230 may distribute the pump light at a desired ratio.

The remaining second portion other than the first portion of the pump light may remain in the clad of the second signal optical fiber 272. The first portion of the pump light may be less than the second portion of the pump light. For example, when the output of the pump light is 27 W, the first portion of the pump light may be 1 W. The second portion of the pump light, 26 W, may remain in the second signal optical fiber 272 to be coupled with the second signal light. The first signal light may exist in the core of the first signal optical fiber 271 through the optical coupler 230, and the first portion of the pump light may exist in the clad of the first signal optical fiber 271. Thereafter, the first signal light may be amplified as a second signal light by absorbing the first portion of the pump light through the first gain medium 241. The second signal light may be transferred to the optical element 250. The first amplifier may refer to a configuration that performs single-stage amplification and includes the first gain medium 241 and the optical element 250.

The optical element 250 may be an element in which the first optical isolator 151 and the first filter 153 of FIG. 2 are combined. That is, the optical element 250 may transfer the second signal light in the traveling direction without loss and may remove noise or reflected signals incident in the opposite direction to the traveling direction. In addition, the optical element 250 may remove noise generated after amplification and may transfer the clean second signal light to the optical coupler 230.

The second signal light may exist in the core of the second signal optical fiber 272 through the optical coupler 230, and the second portion of the pump light may exist in the clad of the second signal optical fiber 272. Thereafter, the second signal light may be amplified as a third signal light by absorbing the second portion of the pump light through the second gain medium 242. The second amplifier may refer to a configuration that includes the second gain medium 242 to perform two-stage amplification. The third signal light may be output to the outside through the end cap 260.

As described above, the laser radar device 200 of FIG. 3 may have a smaller number of optical couplers compared to the laser radar device 100 of FIG. 2. That is, it may be understood that the first and second optical couplers 131 and 132 of FIG. 2 are combined and changed into the single optical coupler 230 of FIG. 3. In addition, by using the optical element 250 in which the optical isolator and the filter are combined, the laser radar device 100 may be miniaturized.

Figure 4A:
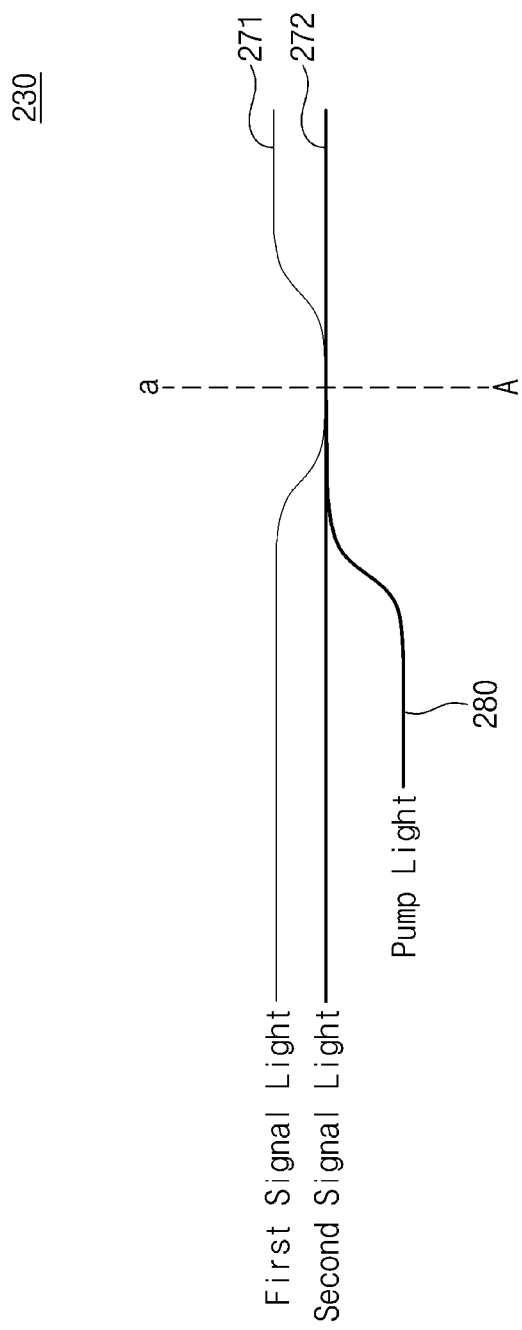
FIGS. 4A to 4C are diagrams illustrating an optical coupler of FIG. 3.
Figure 4B:
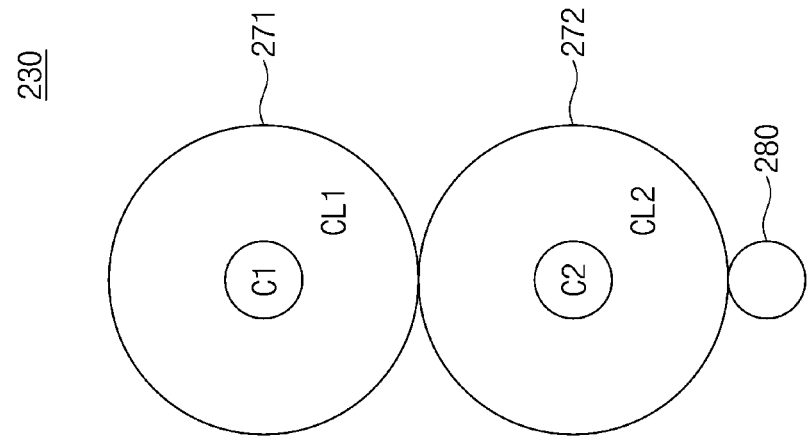
Figure 4C:
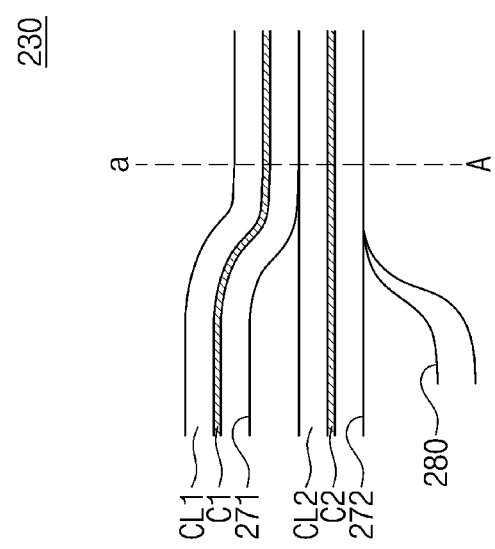

FIGS. 4A to 4C are diagrams illustrating the optical coupler 230 of FIG. 3. FIG. 4A is a diagram illustrating a flow of optical signals in the optical coupler 230, FIG. 4B is an enlarged view of the optical coupler 230, and FIG. 4C is a cross-sectional view taken along line a-A of FIG. 4B.

Referring to FIGS. 3, 4A, and 4B, each of the first signal light, the second signal light, and the pump light may be transferred through the first signal optical fiber 271, the second signal optical fiber 272, and the pump optical fiber 280. The first signal optical fiber 271 may include a first core C1 and a first clad CL1 surrounding the first core C1. The second signal optical fiber 272 may include a second core C2 and a second clad CL2 surrounding the second core C2. The pump optical fiber 280 may include a multi-mode core. For convenience of description, the pump optical fiber 280 in FIG. 4B is illustrated as being composed of a single layer but is not limited thereto.

The first signal light may be transferred through the core C1 of the first signal optical fiber 271, and the second signal light may be transferred through the core C2 of the second signal optical fiber 272. The pump light may be transferred through the pump optical fiber 280 and sequentially coupled to the second signal optical fiber 272 and the first signal optical fiber 271 in the optical coupler 230.

The pump optical fiber 280 may be tapered while being stretched in the traveling direction of the pump light. The cross-sectional area of the pump optical fiber 280 may gradually decrease in the direction in which the pump light travels. When the cross-sectional area of the pump optical fiber 280 is less than a predetermined area, the pump optical fiber 280 may be heated and bonded to the second signal optical fiber 272 in parallel. Accordingly, most of the pump light may be coupled from the pump optical fiber 280 to the second clad CL2 of the second signal optical fiber 272.

The first signal optical fiber 271 and the second signal optical fiber 272 may be bonded in parallel while being stretched in the traveling direction of the first signal light. The first clad CL1 of the first signal optical fiber 271 and the second clad CL2 of the second signal optical fiber 272 may be fused. Accordingly, the first portion of the pump light of the second clad CL2 may be coupled to the first clad CL1. A tensile distance or a fusion distance of the first clad CL1 and the second clad CL2 may be adjusted depending on the degree of coupling.

The second portion of the pump light excluding the first portion may remain in the second clad CL2. As a result, the first signal light may exist in the first core C1, the second signal light may exist in the second core C2, the first portion of the pump light may exist in the first clad CL1, and the second portion of the pump light may exist in the second clad CL2.

The line a-A of FIGS. 4A and 4B may indicate a point at which coupling of the first signal optical fiber 271 and the second signal optical fiber 272 starts. Alternatively, The line a-A may indicate a point at which coupling of the second signal optical fiber 272 and the pump optical fiber 280 is already completed.

Referring to FIG. 4C, the cross-sectional area of the first signal optical fiber 271 and the cross-sectional area of the second signal optical fiber 272 may be the same to each other. Since the pump optical fiber 280 is stretched, the cross-sectional area of the pump optical fiber 280 may be less than the cross-sectional area of the first signal optical fiber 271 and the cross-sectional area of the second signal optical fiber 272. The first signal optical fiber 271 and the second signal optical fiber 272 may be bonded, and the second signal optical fiber 272 and the pump optical fiber 280 may be bonded. In this case, the first signal optical fiber 271 and the pump optical fiber 280 may be spaced apart from each other. In FIG. 4C, a center of the first signal optical fiber 271, a center of the second signal optical fiber 272, and a center of the pump optical fiber 280 are illustrated to lie on the same line, but the present disclosure is not limited thereto. For example, a line connecting the center of the first signal optical fiber 271 and the center of the second signal optical fiber 272 and a line connecting the center of the second signal optical fiber 272 and the center of the pump optical fiber 280 may be perpendicular to each other.

Figure 5:
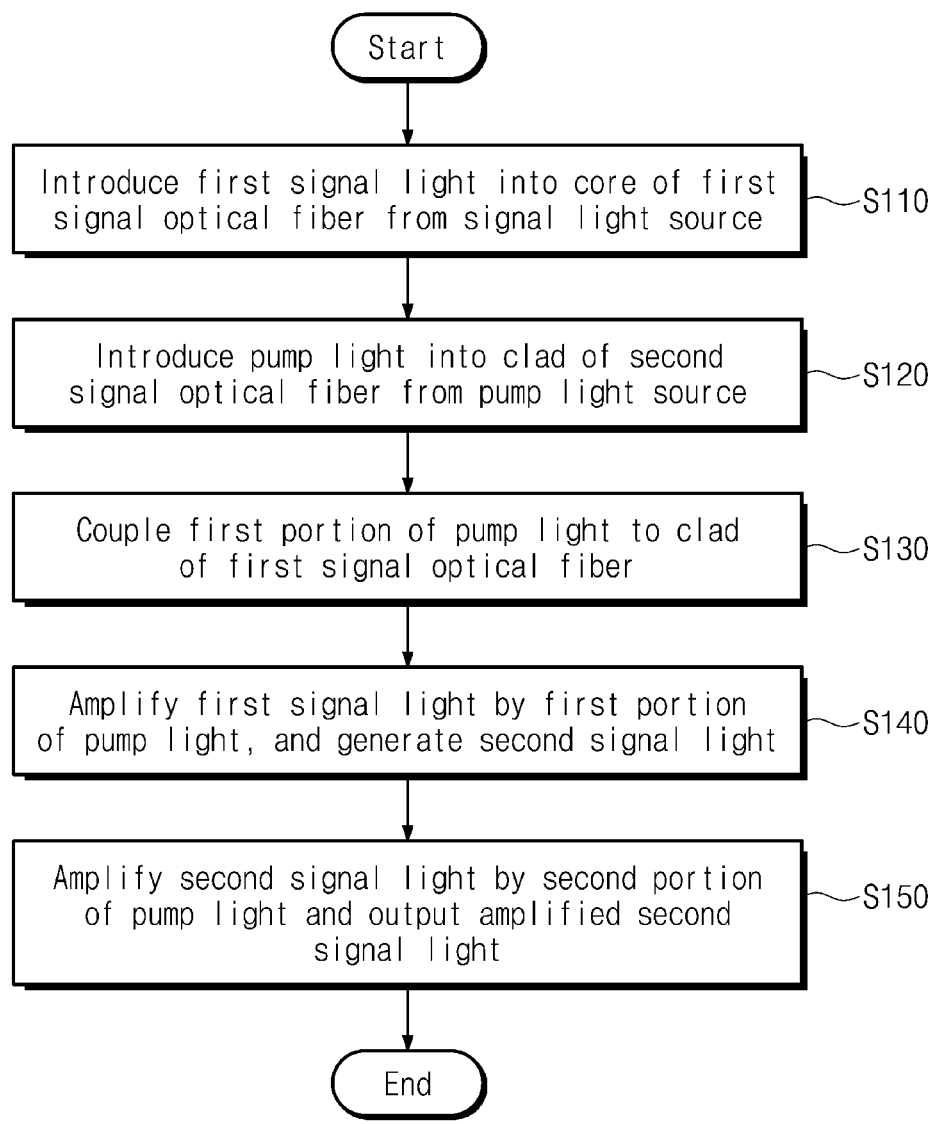
FIG. 5 is a flowchart illustrating an operation method of the laser radar device of FIG. 3.

FIG. 5 is a flowchart illustrating an operation method of the laser radar device of FIG. 3. Referring to FIGS. 3 and 5, in operation S110, the first signal light may be introduced into the core of the first signal optical fiber 271 from the signal light source 210. In operation S120, the pump light may be introduced into the clad of the second signal optical fiber 272 from the pump light source 220. For example, the pump light may be introduced into the clad of the second signal optical fiber 272 at the optical coupler 230. The introduced pump light may be distributed to the first signal optical fiber 271.

In operation S130, the first portion of the pump light may be coupled to the clad of the first signal optical fiber 271. For example, the first portion of the pump light may be coupled to the clad of the first signal optical fiber 271 depending on the tensile distance or the fusion distance of the first signal optical fiber 271 and the second signal optical fiber 272 at the optical coupler 230.

In operation S140, the first signal light may be amplified by the first portion of the pump light. For example, the first gain medium 241 may absorb the first portion of the pump light to generate the second signal light which is obtained by amplifying the first signal light. As the second signal light passes through the optical element 250, noise may be removed. The second signal light may be input back to the optical coupler 230 through the second signal optical fiber.

In operation S150, the second signal light may be amplified by the second portion of the pump light. For example, the second gain medium 242 may absorb the second portion of the pump light to generate the third signal light which is obtained by amplifying the second signal light. The third signal light may be output to the outside of the laser radar device 200.

Figure 6:
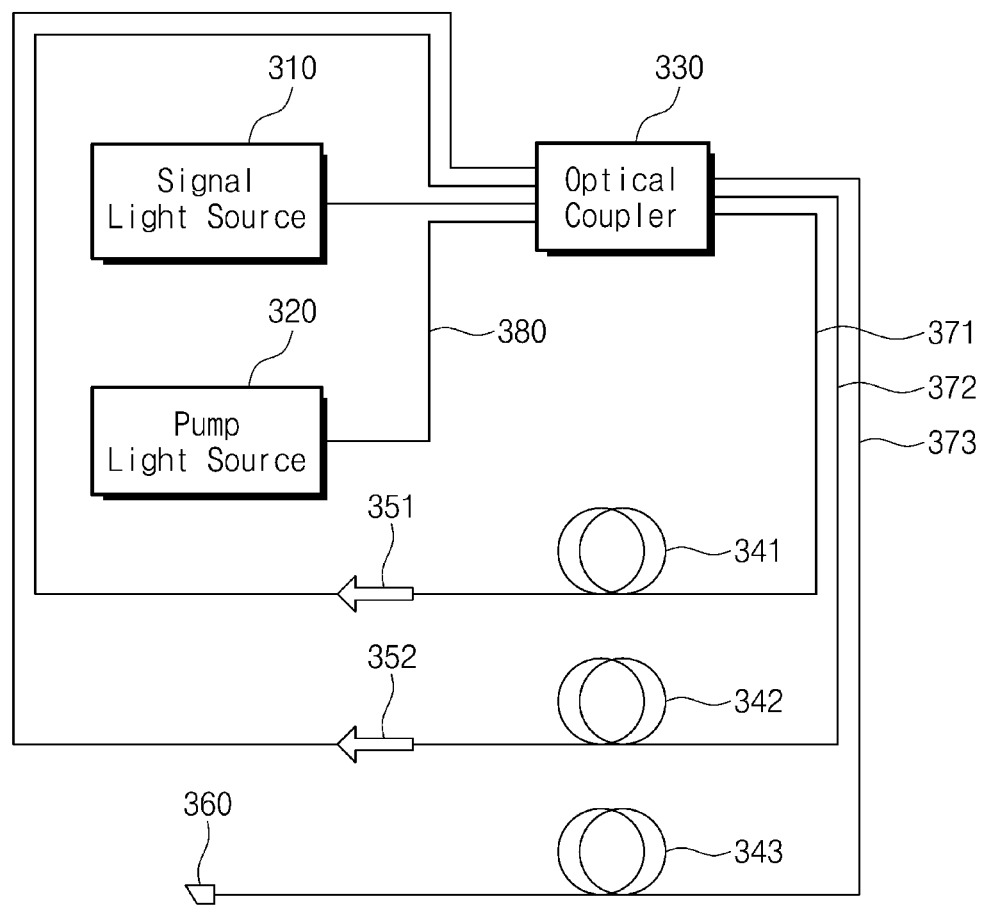
FIG. 6 is a block diagram of a laser radar device according to an embodiment of the present disclosure.

FIG. 6 is a block diagram of a laser radar device according to an embodiment of the present disclosure. Referring to FIGS. 2, 3, and 6, a laser radar device 300 may include a signal light source 310, a pump light source 320, an optical coupler 330, and first to third gain media 341, 342, and 343, first and second optical elements 351 and 352, and an end cap 360. Since the signal light source 310, the pump light source 320, the first to third gain media 341, 342, and 343, the first and second optical elements 351 and 352, and the end cap 360 of FIG. 6 are similar to the signal light source 210, the pump light source 220, the first and second gain media 241 and 242, the optical element 250, and the end cap 260 of FIG. 3, additional description thereof will be omitted to avoid redundancy.

The number of amplification stages of the laser radar device 300 may be one more than the number of amplification stages of the laser radar device 200 of FIG. 3. In detail, the laser radar device 200 of FIG. 3 may perform two-stage amplification, whereas the laser radar device 300 of FIG. 6 may perform three-stage amplification. Accordingly, the signal optical fiber, the gain medium, and the optical element are further increased by one, and the coupling method of first to third signal optical fibers 371, 372, and 373 and a pump optical fiber 380 in the optical coupler 330 and distribution method of the pump light may be different. Hereinafter, the laser radar device 300 of FIG. 6 will be described based on differences from the laser radar device 200 of FIG. 3.

Hereinafter, the first portion of the pump light may be a portion through which the pump light is transferred from the third signal optical fiber to the first signal optical fiber through the optical coupler 330, and the second portion of the pump light may be a portion through which the pump light is transferred from the third signal optical fiber to the second signal optical fiber through the optical coupler 330, and the third portion of the pump light may be a portion through which the pump light is transferred from the pump optical fiber to the third signal optical fiber through the optical coupler 330. Most of the power of the pump light may be transferred to the third signal optical fiber through the third portion. The power of the pump light from the third signal optical fiber to the first signal optical fiber or the second signal optical fiber may be transferred back to the first portion or the second portion.

The signal light source 310 may output the first signal light, and the pump light source 320 may output the pump light. The first signal light may be transferred to the optical coupler 330 through the first signal optical fiber 371, and the pump light may be transferred to the optical coupler 330 through the pump optical fiber 380. The optical coupler 330 may couple the first signal optical fiber 371, the second signal optical fiber 372, the third signal optical fiber 373, and the pump optical fiber 380, and may distribute the pump light to the first signal optical fiber 371, the second signal optical fiber 372, and the third signal optical fiber 373.

In the optical coupler 330, the first signal optical fiber 371, the second signal optical fiber 372, and the third signal optical fiber 373 may be bonded in parallel to one another. In the optical coupler 330, the pump optical fiber 380 may be bonded parallel to the third signal optical fiber 373. In this case, the pump optical fiber 380 may be spaced apart from the first signal optical fiber 371 and the second signal optical fiber 372.

The pump light may be transferred from the pump optical fiber 380 to the third signal optical fiber 373 through the optical coupler 330. Through the optical coupler 330, the first portion of the pump light may be transferred from the third signal optical fiber 373 to the first signal optical fiber 371, and the second portion of the pump light may be transferred from the third signal optical fiber 373 to the second signal optical fiber 372. The third portion of the pump light excluding the first portion and the second portion may remain in the third signal optical fiber 373. The output of the third portion may be greater than the sum of the output of the first portion and the output of the second portion. For example, when the pump light has an output of 27 W, each of the first portion and the second portion may have an output of 1 W, and the third portion may have an output of 25 W.

The first amplifier may include the first gain medium 341 and the first optical element 351 (e.g., an optical isolator and a filter). The first gain medium 341 may receive the first signal light and the first portion of the pump light from the first signal optical fiber 371 and may amplify the first signal light by transferring the first portion to the first signal light. Noise may be removed from the second signal light which is obtained by amplifying the first signal light while passing through the first optical device 351 (e.g., an optical isolator and a filter). The first optical device 351 may transfer the second signal light to the optical coupler 330 through the second signal optical fiber 372.

The second amplifier may include the second gain medium 342 and the second optical element 352 (e.g., an optical isolator and a filter). The second gain medium 342 may receive the second signal light and the second portion of the pump light from the second signal optical fiber 372 and may amplify the second signal light by transferring the second portion to the second signal light. Noise may be removed from the third signal light which is obtained by amplifying the second signal light while passing through the second optical device 352. The second optical device 352 may transfer the third signal light to the optical coupler 330 through the third signal optical fiber 373.

The third amplifier may include the third gain medium 343. The third gain medium 343 may receive the third signal light and the third portion of the pump light from the third signal optical fiber 373 and may amplify the third signal light by transferring the third portion to the third signal light. The amplified third signal light may be output to the outside through the end cap 360.

Although the laser radar device 300 of FIG. 6 performs three-stage amplification, the number of amplification stages is not limited thereto. In this case, the optical coupler may couple the signal optical fiber proportional to the number of amplifications stages and the single pump optical fiber and may distribute the pump light to a plurality of signal optical fibers. Most of the output of the pump light may be coupled to a signal optical fiber corresponding to an end amplification stage among the plurality of signal optical fibers.

Figure 7B:
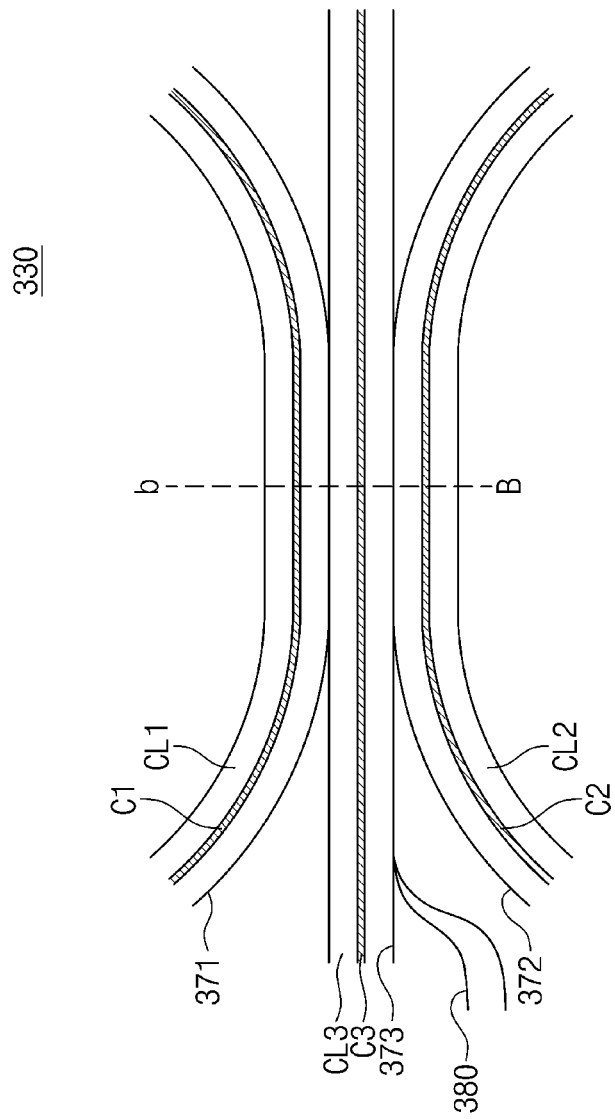
Figure 7C:
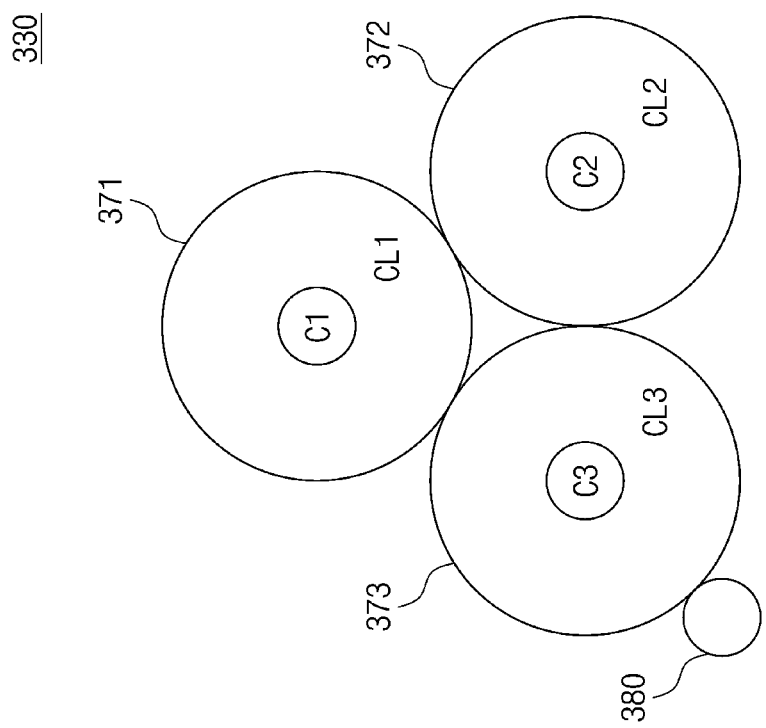

FIGS. 7A to 7C are diagrams illustrating an optical coupler of FIG. 6. FIG. 7A is a diagram illustrating a flow of optical signals in the optical coupler 330, FIG. 7B is an enlarged view of the optical coupler 330, and FIG. 7C is a cross-sectional view taken along line b-B of FIG. 7B.

Referring to FIGS. 6, 7A, and 7B, the first signal light, the second signal light, the third signal light, and the pump light may be transferred through the first signal optical fiber 371, the second signal optical fiber 372, and the third signal optical fiber 373, and the pump optical fiber 380, respectively. The first signal optical fiber 371 may include the first core C1 and the first clad CL1 surrounding the first core C1. The second signal optical fiber 372 may include the second core C2 and the second clad CL2 surrounding the second core C2. The third signal optical fiber 373 may include the third core C3 and the third clad CL3 surrounding the third core C3. The pump optical fiber 380 may include a multi-mode core.

Since the first signal optical fiber 371, the second signal optical fiber 372, the third signal optical fiber 373, and the pump optical fiber 380 of FIGS. 7A and 7B are similar to the first signal optical fiber 271, the second signal optical fiber 272, and the pump optical fiber 280 of FIGS. 4A and 4B, except that the third signal optical fiber 373 is added, and thus additional description thereof will be omitted to avoid redundancy.

The first signal light may be transferred through the first core C1 of the first signal optical fiber 371, the second signal light may be transferred through the second core C2 of the second signal optical fiber 372, and the third signal light may be transferred through the third core C3 of the third signal optical fiber 373. The pump light may be transferred through the pump optical fiber 380 and may be coupled to the first signal optical fiber 371, the second signal optical fiber 372, and the third signal optical fiber 373 in the optical coupler 330.

The pump optical fiber 380 may be bonded in parallel to the third signal optical fiber 373 when the cross-sectional area is equal to or less than a predetermined area while being stretched in the traveling direction of the pump light. Accordingly, the pump light may be coupled to the third clad CL3 of the third signal optical fiber 373 from the pump optical fiber 380.

The first signal optical fiber 371, the second signal optical fiber 372, and the third signal optical fiber 373 may be bonded in parallel to one another while being stretched in the traveling direction of the first signal light. Accordingly, the first portion of the pump light of the third clad CL3 may be coupled to the first clad CL1. In addition, the second portion of the pump light of the third clad CL3 may be coupled to the second clad CL2. The third portion of the pump light excluding the first portion and the second portion may remain in the third clad CL3.

As a result, the first signal light may exist in the first core C1, the second signal light may exist in the second core C2, the third signal light may exist in the third core C3, the first portion of the pump light may exist in the first clad CL1, the second portion of the pump light may exist in the second clad CL2, and the third portion of the pump light may exist in the third clad CL3.

The line b-B in FIGS. 7A and 7B may indicate a point at which coupling of the first signal optical fiber 371, the second signal optical fiber 372, and the third signal optical fiber 373 is started. Alternatively, the line b-B may indicate a point at which coupling of the third signal optical fiber 373 and the pump optical fiber 380 is already completed.

Referring to FIG. 7C, the cross-sectional area of the first signal optical fiber 371, the cross-sectional area of the second signal optical fiber 372, and the cross-sectional area of the third signal optical fiber 373 may be the same to one another. The cross-sectional area of the pump optical fiber 380 may be less than the cross-sectional area of the first signal optical fiber 271 by being stretched. The first signal optical fiber 371, the second signal optical fiber 372, and the third signal optical fiber 373 may be bonded in parallel to one another, and the third signal optical fiber 373 and the pump optical fiber 380 may be bonded. In this case, the pump optical fiber 380 may be spaced apart from the first signal optical fiber 371 and the second signal optical fiber 372. The arrangement of the first signal optical fiber 371, the second signal optical fiber 372, the third signal optical fiber 373, and the pump optical fiber 380 is not limited to FIG. 7C. For example, in FIG. 7C, the first signal optical fiber 371 and the second signal optical fiber 372 are illustrated as being bonded to each other, but the present disclosure is not limited thereto and may be spaced apart. That is, the first signal optical fiber 371 and the second signal optical fiber 372 may be bonded only to the third signal optical fiber 373.

Figure 8:
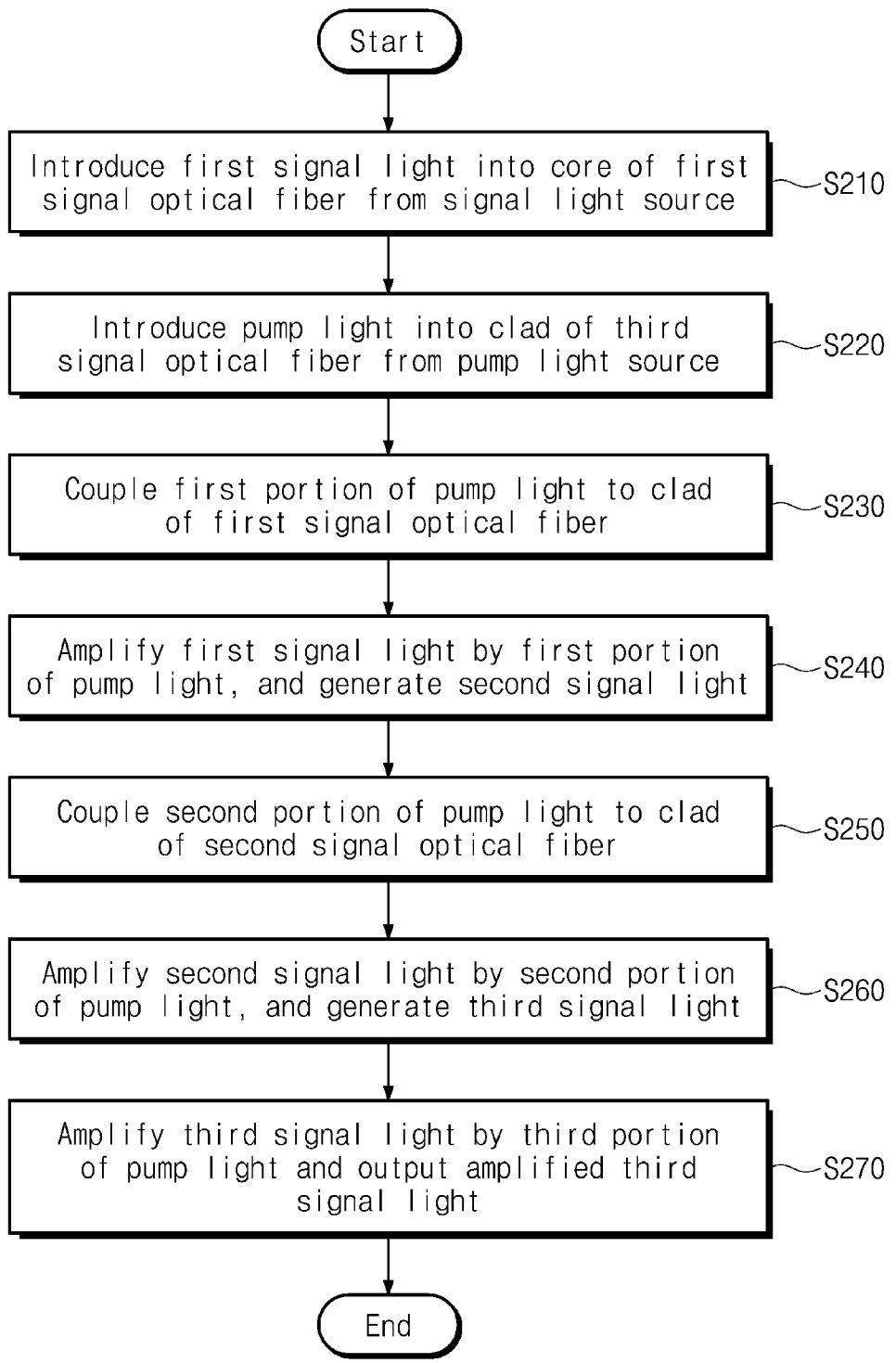
FIG. 8 is a flowchart illustrating an operation method of the laser radar device of FIG. 6.

FIG. 8 is a flowchart illustrating an operation method of the laser radar device of FIG. 6. Since an operation method of FIG. 8 is similar to the operation method of FIG. 6, additional description thereof will be omitted to avoid redundancy.

Referring to FIGS. 6 and 8, in operation S210, the first signal light may be introduced into the core of the first signal optical fiber 371 from the signal light source 310. In operation S220, the pump light may be introduced into the clad of the third signal optical fiber 373 from the pump light source 320. The introduced pump light may be distributed to the first signal optical fiber 371 and the second signal optical fiber 372.

In operation S230, the first portion of the pump light may be coupled to the clad of the first signal optical fiber 371. In operation S240, the first signal light may be amplified by the first portion of the pump light, and may be generated as the second signal light. The second signal light may be input back to the optical coupler 330 through the core of the second signal optical fiber 372.

In operation S250, the second portion of the pump light may be coupled to the clad of the second signal optical fiber 372. In operation S260, the second signal light may be amplified by the second portion of the pump light, and may be generated as the third signal light. The third signal light may be input back to the optical coupler 330 through the core of the third signal optical fiber 373. In operation S270, the third signal light may be amplified by the third portion of the pump light and may be output to the outside of the laser radar device 300 through the end cap 360.

Figure 9:
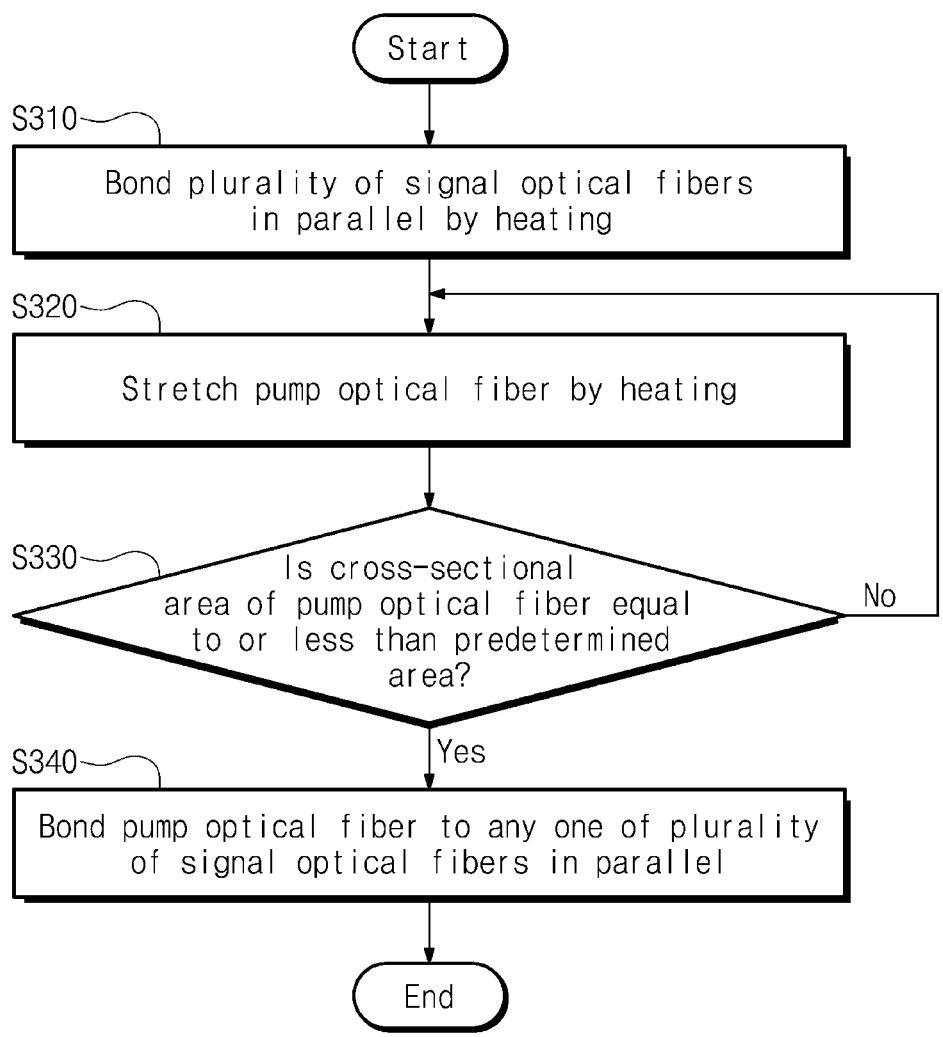
FIG. 9 is a flowchart illustrating a method of manufacturing an optical coupler according to an embodiment of the present disclosure.

FIG. 9 is a flowchart illustrating a method of manufacturing an optical coupler according to an embodiment of the present disclosure. The optical coupler according to an embodiment of the present disclosure may include a single pump optical fiber transferring the pump light and a plurality of signal optical fibers transferring the signal light. The optical coupler may be referred to as a pump-signal optical coupler and may be configured to distribute the pump light to a plurality of signal optical fibers.

Referring to FIG. 9, in operation S310, a plurality of signal optical fibers may be bonded in parallel to one another. The plurality of signal fibers may be heated and stretched. Accordingly, the dads of the plurality of signal optical fibers may be fused to the clads of the adjacent signal optical fibers. In this case, a coupling degree may be controlled by adjusting the tensile distances of the plurality of signal optical fibers.

In operation S320, the pump optical fiber may be heated and stretched. Alternatively, the pump optical fiber may be stretched in a direction parallel to the plurality of signal optical fibers. That is, the pump optical fiber may be elongated in the traveling direction of the pump light, and in this case, the cross-sectional area of the pump optical fiber may gradually decrease in the traveling direction of the pump light.

In operation S330, depending on whether the cross-sectional area of the pump optical fiber is equal to or less than a predetermined area, the manufacturing method of the optical coupler may vary. When the cross-sectional area of the pump optical fiber is greater than the predetermined area, the process returns to operation S320, and the pump optical fiber may be further stretched. When the cross-sectional area of the pump optical fiber is less than the predetermined area, operation S340 may be performed.

In operation S340, the pump optical fiber may be bonded in parallel to any one of the plurality of signal optical fibers. In this case, the pump optical fiber may be spaced apart from one or more signal optical fibers other than one bonded signal optical fiber among the plurality of signal optical fibers.

Any one signal optical fiber to which the pump optical fiber is bonded in operation S340 may be an end signal optical fiber corresponding to an end amplification stage among the multi-stage amplification stages. That is, the pump light may be incident into the clad of the end signal optical fiber to which the pump optical fiber is bonded, and the incident pump light may be distributed to other signal optical fibers. Most of the pump light incident on the clad of the end signal optical fiber may remain in the clad of the end signal optical fiber and may be used for end amplification.

According to an embodiment of the present disclosure, multi-stage amplification stages may be efficiently configured with a single signal light source and a single pump light source, and accordingly, a laser radar device may be miniaturized and driven with low power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A laser radar device comprising:
a signal light source configured to output a first signal light;
a pump light source configured to output a pump light;
an optical coupler configured to receive the first signal light and the pump light;
a pump optical fiber configured to transfer the pump light;
a first signal optical fiber configured to transfer the first signal light;
a first amplifier configured to receive and amplify the first signal light from the first signal optical fiber, wherein the amplified first signal light is input back to the optical coupler;
a second signal optical fiber configured to receive and transfer a second signal light from the first amplifier, the second signal light being the amplified first signal light; and
a second amplifier configured to receive and amplify the second signal light from the second signal optical fiber, wherein the optical coupler is connected to the first signal optical fiber, the second signal optical fiber, and the pump optical fiber, and configured to distribute the pump light to the first signal optical fiber and the second signal optical fiber.

2. The laser radar device of claim 1, wherein the optical coupler is configured such that the first signal optical fiber and the second signal optical fiber are tapered and fused in parallel to each other, and
wherein the optical coupler is configured such that the pump optical fiber is tapered and fused in parallel to the second signal optical fiber, and the pump optical fiber is separated from the first signal optical fiber without direct contact therebetween.

3. The laser radar device of claim 2, wherein the pump optical fiber is heated and elongated in a direction parallel to the second signal optical fiber and tapered and fused to the second signal optical fiber.

4. The laser radar device of claim 2, wherein the first signal optical fiber includes a first core and a first clad,
wherein the second signal optical fiber includes a second core and a second clad,
wherein the second core is configured to receive the second signal light from the first amplifier, and
wherein the second clad is configured to receive the pump light from the pump optical fiber in the optical coupler.

5. The laser radar device of claim 4, wherein the first core is configured to receive the first signal light from the signal light source, and
wherein the first clad is configured to receive a first portion of the pump light from the second clad in the optical coupler.

6. The laser radar device of claim 1, wherein the first amplifier includes a first gain medium configured to absorb a first portion of the pump light and to amplify the first signal light, and
wherein the second amplifier includes a second gain medium configured to absorb a second portion of the pump light and to amplify the second signal light.

7. The laser radar device of claim 6, wherein a power of the second portion is greater than a power of the first portion.

8. The laser radar device of claim 6, wherein the first amplifier further includes:
an optical isolator configured so that the second signal light enters and passes through the optical isolator; and
a filter configured to remove noise of the second signal light.

9. The laser radar device of claim 1, wherein the first signal optical fiber and the second signal optical fiber include a double clad optical fiber.

10. A laser radar device comprising:
a signal light source configured to output a first signal light;
a pump light source configured to output a pump light;
an optical coupler configured to receive the first signal light and the pump light;
a pump optical fiber configured to transfer the pump light;

a first signal optical fiber configured to transfer the first signal light;

a first amplifier configured to receive and amplify the first signal light from the first signal optical fiber, wherein the amplified first signal light is input back to the optical coupler;

a second signal optical fiber configured to receive and transfer a second signal light from the first amplifier, the second signal light being the amplified first signal light;

a second amplifier configured to receive and amplify the second signal light from the second signal optical fiber, wherein the amplified second signal light is input back to the optical coupler;

a third signal optical fiber configured to receive and transfer a third signal light from the second amplifier, the third signal light being the amplified second signal light;

a third amplifier configured to receive and amplify the third signal light from the third signal optical fiber, wherein the optical coupler is connected to the first signal optical fiber, the second signal optical fiber, the third signal optical fiber, and the pump optical fiber, and configured to distribute the pump light to the first signal optical fiber, the second signal optical fiber, and the third signal optical fiber.

11. The laser radar device of claim 10, wherein the optical coupler is configured such that the first signal optical fiber, the second signal optical fiber, and the third signal optical fiber are tapered and fused in parallel to one another, and wherein the optical coupler is configured such that the pump optical fiber is fused in parallel to the third signal optical fiber and the pump optical fiber is separated from the first signal optical fiber and the second signal optical fiber without direct contact therebetween.

12. The laser radar device of claim 10, wherein the pump light is transferred from the pump optical fiber to the third signal optical fiber through the optical coupler.

13. The laser radar device of claim 12, wherein a first portion of the pump light is transferred from the third signal optical fiber to the first signal optical fiber through the optical coupler, and wherein a second portion of the pump light is transferred from the third signal optical fiber to the second signal optical fiber through the optical coupler.

14. The laser radar device of claim 13, wherein the first amplifier includes a first gain medium configured to absorb the first portion of the pump light and to amplify the first signal light, and wherein the second signal light amplified by the first gain medium is input to the second signal optical fiber.

15. The laser radar device of claim 14, wherein the second amplifier includes a second gain medium configured to absorb the second portion of the pump light and to amplify the second signal light, and wherein the third signal light amplified by the second gain medium is input to the third signal optical fiber.

16. The laser radar device of claim 15, wherein the third amplifier includes a third gain medium configured to absorb a third portion of the pump light and to amplify the second signal light, and wherein a signal light amplified by the third gain medium is output to an end cap.

17. The laser radar device of claim 16, wherein an output of the third portion is greater than a sum of an output of the first portion and an output of the second portion.

* * * * *